(12) United States Patent  
Ma et al.

(10) Patent No.: US 10,198,570 B2  
(45) Date of Patent: Feb. 5, 2019

(54) DYNAMIC PASSWORD LOCK AND REMOTE PASSWORD LOCK APPARATUS

(71) Applicant: SGSG SCIENCE & TECHNOLOGY CO., LTD. ZHUHAI, Zhuhai, Guangdong (CN)

(72) Inventors: Zheng Ma, Guangdong (CN); Zhihong Xiao, Guangdong (CN); Jiaxian Chen, Guangdong (CN); Ming Peng, Guangdong (CN)

(73) Assignee: SGSG SCIENCE & TECHNOLOGY CO., LTD. ZHUHAI, Zhuhai (CN)

( * ) Notice: Subject to any disclaimer, the term of this patent is extended or adjusted under 35 U.S.C. 154(b) by 231 days.

(21) Appl. No.: 15/153,739

(22) Filed: May 13, 2016

(65) Prior Publication Data

US 2016/0253493 A1 Sep. 1, 2016

Related U.S. Application Data

(63) Continuation of application No. PCT/CN2015/078350, filed on May 6, 2015.

(30) Foreign Application Priority Data

Aug. 6, 2014 (CN) .................... 2014 2 0441753 U

(51) Int. Cl.
*G06F 21/45* (2013.01)
*G06F 21/32* (2013.01)
*G07C 9/00* (2006.01)

(52) U.S. Cl.
CPC ............. *G06F 21/45* (2013.01); *G06F 21/32* (2013.01); *G07C 9/00174* (2013.01); *G06F 2221/2101* (2013.01)

(58) Field of Classification Search
CPC .. G06F 21/32; G06F 21/45; G06F 2221/2101; G07C 9/00174

(Continued)

(56) References Cited

U.S. PATENT DOCUMENTS

| 2008/0253624 | A1* | 10/2008 | Wong | ........................ | G06F 1/26 382/124 |
| 2012/0019379 | A1* | 1/2012 | Ben Ayed | .......... | G08B 13/1436 340/539.1 |
| 2015/0123468 | A1* | 5/2015 | Wu | ......................... | H02H 1/00 307/10.1 |

FOREIGN PATENT DOCUMENTS

| CN | 101949239 A | 1/2011 |
| CN | 202718489 U | 2/2013 |
| CN | 204002107 U | 12/2014 |

OTHER PUBLICATIONS

International Search Report of PCT Patent Application No. PCT/CN2015/078350 dated Aug. 13, 2015.

* cited by examiner

*Primary Examiner* — Brandon S Hoffman
*Assistant Examiner* — Nega Woldemariam

(57) ABSTRACT

Disclosed are a dynamic password lock and a remote password lock apparatus. The dynamic password lock includes a bolt, a bolt actuation device, a microprocessor, an unlocking authentication device and a power supply conversion device, the unlocking authentication device being connected electrically with the bolt actuation device through the microprocessor to actuate the bolt, in which: the dynamic password lock further includes a physical interface, the physical interface is connected electrically with the microprocessor to serve as a communication interface for the dynamic password lock to communicate with external communication equipment; and the physical interface is con- (Continued)

nected electrically with the power supply conversion device to serve as a powering interface for external powering equipment to power the dynamic password lock. The remote password lock includes the dynamic password lock, an IPC and a storage device.

9 Claims, 1 Drawing Sheet

(58) Field of Classification Search
USPC .......................................................... 726/18
See application file for complete search history.

DYNAMIC PASSWORD LOCK AND REMOTE PASSWORD LOCK APPARATUS

CROSS-REFERENCE TO RELATED APPLICATIONS

The present application is a Continuation Application of PCT application No. PCT/CN2015/078350 filed on May 6, 2015, which claims the benefit of Chinese Utility Model Application No. 201420441753.1 filed on Aug. 6, 2014, the contents of which are hereby incorporated by reference.

TECHNICAL FIELD

The present disclosure relates to the technical field of dynamic password locks, and in particular to a dynamic password lock and a remote password lock apparatus.

BACKGROUND

At present, Automatic Teller Machines (ATMs), safes and the like in the banking industry are generally used to keep valuable items. To ensure the safety of valuable items, unlocking a lockset simply through a password and a key cannot meet safety requirements of the lockset, and functions further required include remotely monitoring of an unlocking log of the lockset and real-time status of the lockset. To implement the above functions, the lockset is required to be provided with a battery device for providing power supply, and with a communication device for communicating with a background server in long or short range through wireless or wired communication. If all the functions are configured in a lockset, the lockset will have a large volume; in addition, if a problem arises in the lockset, it will be difficult to repair it, thus a low factor of safety is resulted.

SUMMARY

To solve the above problems in the prior art, the present disclosure is intended to provide a dynamic password lock and a remote password lock apparatus, which can, on the basis of ensuring normal powering of the dynamic password lock and of ensuring its communication function, reduce effectively the cost of the dynamic password lock, enable the dynamic password lock to be repaired easily and thus have a high factor of safety.

To this end, the present disclosure provides a dynamic password lock including a bolt, a bolt actuation device, a microprocessor, an unlocking authentication device and a power supply conversion device, the unlocking authentication device being connected electrically with the bolt actuation device through the microprocessor to actuate the bolt, in which: the dynamic password lock further comprises a physical interface, the physical interface is connected electrically with the microprocessor to serve as a communication interface for the dynamic password lock to communicate with external communication equipment; and the physical interface is connected electrically with the power supply conversion device to serve as a powering interface for external powering equipment to power the dynamic password lock.

Further, the dynamic password lock also comprises a bolt position detection device which is connected electrically with the physical interface through the microprocessor to communicate with the external communication device.

In an embodiment, the bolt position detection device may be a magnetic field sensor or an infrared sensor.

In an embodiment, the power supply conversion device may be a buck converter.

In an embodiment, an output voltage of the buck converter may be a DC voltage of 3.3 Volt.

In an embodiment, the bolt actuation device may be an electromagnetic actuator, a micro stepping motor or a micro DC motor.

In an embodiment, the unlocking authentication device may be a PIN pad, a fingerprint authentication device or an information button authentication device.

In an embodiment, the physical interface may be a Universal Serial Bus (USB) interface using the standard USB protocol.

In an embodiment, the USB interface may be arranged on a surface of a housing of the dynamic password lock or extend out of the housing, and the USB interface may include a male USB connector or a male mini USB connector provided with a USB lead-out connection wire of a plug-in type.

The present disclosure further provides a remote password lock apparatus including the above dynamic password lock, an Industrial Personal Computer (IPC) and a storage device, in which: the IPC is connected electrically with the dynamic password lock through the physical interface to communicate with the dynamic password lock and to power the dynamic password lock; and the storage device establishes a communication connection with the dynamic password lock through the IPC.

Compared with the prior art, the dynamic password lock according to the present disclosure provides, through the arrangement of a physical interface, a communication interface with external equipment and a powering interface, so that corresponding functions are not required to be configured in a lockset, which enables the dynamic password lock to have a simple and compact structure, to have effectively-reduced cost, to be repaired easily and thus to have a high factor of safety; the dynamic password lock is powered by a physical interface such as a USB interface, thus there is no need to prepare a battery, which makes the dynamic password lock to be environment friendly. In addition, by means of the above improvement on structure, the remote password lock apparatus according to the present disclosure can meet function requirements such as remotely monitoring of an unlocking log of a lockset and real-time status of the lockset.

DETAILED DESCRIPTION

The disclosure will be further elaborated below in combination with accompanying drawings and specific embodiments, and the description is not intended to limit the present disclosure.

Figure 1:
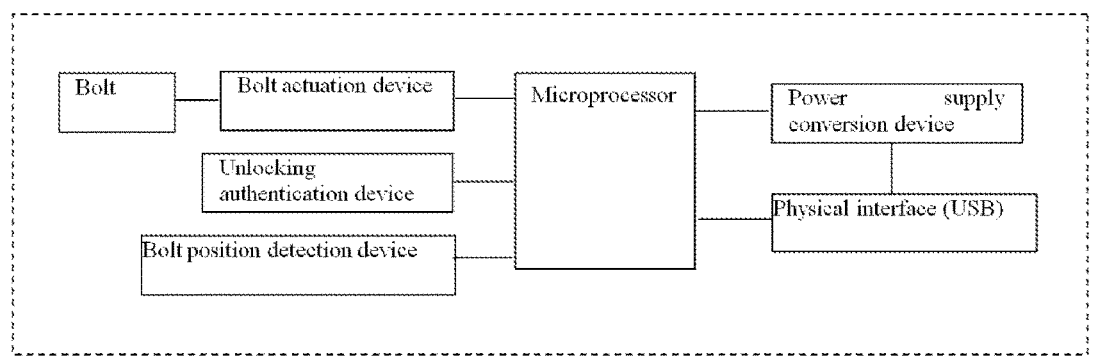
FIG. 1 is a schematic structural diagram of a dynamic password lock according to the present disclosure.

As shown in FIG. 1, a dynamic password lock according to the embodiment includes a bolt, a bolt actuation device, a microprocessor, an unlocking authentication device and a power supply conversion device and physical interface, in which: the bolt is connected with the bolt actuation device, the bolt actuation device is connected with the bolt and the microprocessor, the microprocessor is connected with the bolt actuation device, the unlocking authentication device is connected electrically with the bolt actuation device through the microprocessor to actuate the bolt, the physical interface is connected with the microprocessor to serve as a communication interface for the dynamic password lock to communicate with external communication equipment; the physical interface is connected electrically with the power supply conversion device to serve as a powering interface for external powering equipment to power the dynamic password lock, that is to say, once the physical interface is connected with the external powering equipment, external power from the external powering equipment can be led to the power supply conversion device, the power supply conversion device then converts the external power so as to provide electrical energy required by the operation of the dynamic password lock. By means of the dynamic password lock according to the present disclosure, powering and communication of a lockset can be implemented simultaneously, the cost of the lockset per se and its repair cost are reduced effectively; furthermore, since there is no need to prepare a battery, the dynamic password lock according to the present disclosure is more environment friendly.

The figure shows that the power supply conversion device is connected electrically with the microprocessor to supply the converted power to the microprocessor, but it should be noted by those skilled in the art that the power supply conversion device can be connected electrically with other component requiring power in the dynamic password lock.

In the embodiment, the physical interface is preferably a USB interface using standard USB protocol, which is arranged on a surface of the housing of the dynamic password lock, and the USB interface may include a male USB connector or a male mini USB connector provided with a USB lead-out connection wire of a plug-in type. In practical applications, the male USB plug or the male mini USB plug is a Type A plug.

The power supply conversion device is preferably a buck converter such as a device for implementing DC to DC voltage adjustment function, for example a DC chopper, and more preferably the output voltage of the buck converter is a DC voltage of 3.3 Volt.

In a preferred embodiment, the dynamic password lock also includes a bolt position detection device which is connected electrically with the physical interface through the microprocessor to communicate with the external communication device. The bolt position detection device may be a magnetic field sensor which can sense a change in magnetic field resulted from movement of the bolt and transmit the change to the microprocessor in the form of an electrical signal, and the microprocessor can store the signal; in the case that the bolt position detection device is a magnetic field sensor, it should be connected (not shown in the figure) electrically with the power supply conversion device so as to ensure its normal operation; the bolt position detection device may also be other known device that can detect a change in position of the bolt in the present technical field, since this is not key to the present disclosure, detailed description thereof will be omitted herein.

It should be noted that the communication between the microprocessor and the external communication equipment through the physical interface can be implemented using existing communication techniques, and since this is not the content of the present disclosure, detailed description thereof will be omitted herein.

In addition, in the present disclosure, examples of the unlocking authentication device include one or more of a PIN pad, a fingerprint authentication device and an information button (ibutton); examples of the bolt actuation device include one or more of an electromagnetic actuator, a micro stepping motor and a micro DC motor.

In an embodiment, the dynamic password lock is divided generally into two parts: a lock body and a lock body controller; specifically, the bolt, the bolt actuation device, the power supply conversion device and the physical interface are arranged on the lock body, and the unlocking authentication device is arranged on the lock body controller. As an alternative embodiment, it is also possible to arrange the microprocessor, the unlocking authentication device on the lock body controller, and to arrange the bolt, the bolt actuation device, the power supply conversion device and the physical interface on the lock body.

Figure 2:
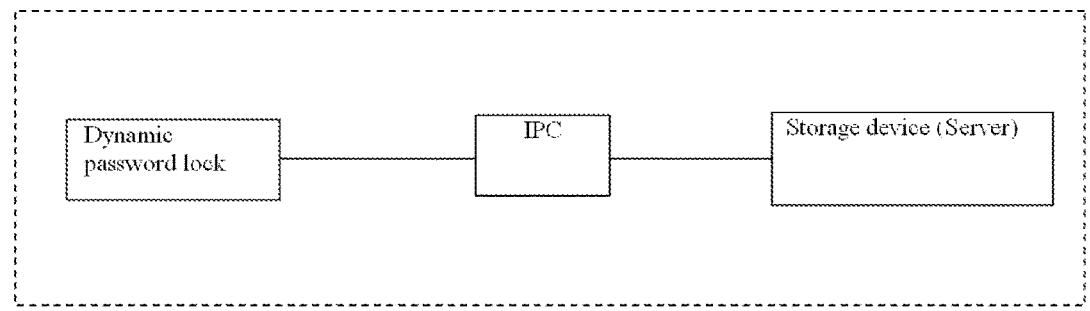
FIG. 2 is a schematic structural diagram of a remote password lock apparatus according to the present disclosure.

In another embodiment of the disclosure, further provided is a remote password lock apparatus, as shown in FIG. 2, the remote password lock apparatus includes the dynamic password lock according to the present disclosure, an Industrial Personal Computer (IPC) and a storage device, specifically, the IPC is connected electrically with the dynamic password lock through the physical interface to communicate with the dynamic password lock and to power the dynamic password lock; and the storage device establishes a communication connection with the dynamic password lock through the IPC.

The storage device can be any storage and recording device in the prior art, such as a server and the like; the storage device establishes a communication connection with the dynamic password lock through the IPC, and acquires, using known communication techniques, information stored by the microprocessor of the dynamic password lock, such as information fed back from the bolt position detection device.

An exemplary process for a user to use the remote password lock is described below. A user performs authentication through the unlocking authentication device, and when the authentication succeeds, the microprocessor controls the bolt actuation device to actuate the bolt so as to unlock the dynamic password lock; the power supply conversion device takes charge of assigning power to the bolt actuation device, the microprocessor and the bolt position detection device; the USB interface (physical interface), on one hand, leads external power and provides the external power to the power supply conversion device, and on the other hand, connects with the IPC; the IPC establishes a remote communication connection with the server (storage device) so that the server can acquire a change in the position of the bolt of the dynamic password lock.

By means of the embodiment, the communication function and power supply function are not both integrated onto the dynamic password lock, instead, they are shared by the IPC, thus the material cost and repair cost of the dynamic password lock are reduced effectively, and the background server can monitor remotely a change in the position of the bolt of the dynamic password lock.

What described above are merely preferred embodiments of the disclosure, it should be noted that some improvements and modifications can be made by those skilled in the art without departing from the spirits and principles of the embodiments of the disclosure, and the improvements and modifications fall into the scope of protection of the disclosure.

The invention claimed is:
1. A dynamic password lock comprising a bolt, a bolt actuation device, a microprocessor, an unlocking authentication device and a power supply conversion device, the unlocking authentication device being connected electrically with the microprocessor, the unlocking authentication device being connected electrically with the bolt actuation device through the microprocessor, the dynamic password lock further comprising a physical interface, the physical interface being a Universal Serial Bus (USB) interface using the standard USB protocol, wherein the dynamic password lock is configured to be connected electrically with an Industrial Personal Computer (IPC) through the physical interface;

the physical interface is connected electrically with the microprocessor to serve as a communication interface for the dynamic password lock to communicate with the IPC;

the unlocking authentication device is configured to be performed authentication by a user;

the microprocessor is configured to control the bolt actuation device to actuate the bolt to unlock the dynamic password lock when the authentication succeeds;

the physical interface is connected electrically with the power supply conversion device to serve as a powering interface for the IPC to power the dynamic password lock; and the power supply conversion device is configured to convert the power of the IPC through the physical interface.

2. The dynamic password lock according to claim 1, further comprising a bolt position detection device which is connected electrically with the physical interface through the microprocessor to communicate with the external communication device.

3. The dynamic password lock according to claim 2, wherein the bolt position detection device is a magnetic field sensor or an infrared sensor.

4. The dynamic password lock according to claim 1, wherein the power supply conversion device is a buck converter.

5. The dynamic password lock according to claim 4, wherein an output voltage of the buck converter is a DC voltage of 3.3 Volt.

6. The dynamic password lock according to claim 1, wherein the bolt actuation device is an electromagnetic actuator, a micro stepping motor or a micro DC motor.

7. The dynamic password lock according to claim 1, wherein the unlocking authentication device is a PIN pad, a fingerprint authentication device or an information button authentication device.

8. The dynamic password lock according to claim 1, wherein the USB interface is arranged on a surface of a housing of the dynamic password lock or extends out of the housing, and the USB interface comprises a male USB connector or a male mini USB connector provided with a USB lead-out connection wire of a plug-in type.

9. A remote password lock apparatus comprising a dynamic password lock, an Industrial Personal Computer (IPC) and a storage device, wherein the dynamic password lock comprises a bolt, a bolt actuation device, a microprocessor, an unlocking authentication device and a power supply conversion device, the unlocking authentication device being connected electrically with the microprocessor, the unlocking authentication device being connected electrically with the bolt actuation device through the microprocessor to actuate the bolt, wherein the dynamic password lock further comprises a physical interface, the physical interface is a Universal Serial Bus (USB) interface using the standard USB protocol, the dynamic password lock is configured to be connected electrically with an Industrial Personal Computer (IPC) through the physical interface;

the physical interface is connected electrically with the microprocessor to serve as a communication interface for the dynamic password lock to communicate with the IPC;

the unlocking authentication device is configured to be performed authentication by a user;

the microprocessor is configured to control the bolt actuation device to actuate the bolt to unlock the dynamic password lock when the authentication succeeds;

the physical interface is connected electrically with the power supply conversion device to serve as a powering interface for the IPC to power the dynamic password lock;

the IPC is connected electrically with the dynamic password lock through the physical interface to communicate with the dynamic password lock and to power the dynamic password lock;

the power supply conversion device is configured to convert the power of the IPC through the physical interface; and the storage device establishes a communication connection with the dynamic password lock through the IPC.

* * * * *